(12) United States Patent
Nishimura (10) Patent No.: US 8,417,407 B2
(45) Date of Patent: Apr. 9, 2013

(54) VEHICULAR ELECTRIC POWER SOURCE CONTROL DEVICE

(75) Inventor: Naoki Nishimura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/254,903

(22) PCT Filed: Oct. 1, 2009

(86) PCT No.: PCT/JP2009/067180
§ 371 (c)(1),
(2), (4) Date: Sep. 6, 2011

(87) PCT Pub. No.: WO2010/103686
PCT Pub. Date: Sep. 16, 2010

(65) Prior Publication Data
US 2011/0320083 A1    Dec. 29, 2011

(30) Foreign Application Priority Data
Mar. 10, 2009  (JP) .................................. 2009-057050

(51) Int. Cl.
G05D 29/00   (2006.01)
(52) U.S. Cl. ........................................................ 701/22
(58) Field of Classification Search ..................... 701/22
See application file for complete search history.

(56) References Cited

U.S. PATENT DOCUMENTS

| | | | | |
|---|---|---|---|---|
| 4,482,812 A | * | 11/1984 | Hori et al. .................... | 290/38 R |
| 6,158,541 A | * | 12/2000 | Tabata et al. .................. | 180/165 |
| 6,476,517 B1 | * | 11/2002 | Okada .......................... | 307/10.2 |
| 6,540,644 B2 | * | 4/2003 | Morimoto et al. ............ | 477/102 |
| 6,924,735 B2 | * | 8/2005 | Ueda et al. ............... | 340/426.28 |
| 7,474,200 B2 | * | 1/2009 | Ogino et al. ............. | 340/426.16 |
| 8,164,301 B2 | * | 4/2012 | Uchida ......................... | 320/109 |
| 2004/0168663 A1 | * | 9/2004 | Matsuura et al. .......... | 123/179.2 |

FOREIGN PATENT DOCUMENTS

| | | |
|---|---|---|
| JP | A-9-209790 | 8/1997 |
| JP | A-11-257123 | 9/1999 |
| JP | A-11-343892 | 12/1999 |
| JP | A-2004-169692 | 6/2004 |
| JP | A-2004-239166 | 8/2004 |

OTHER PUBLICATIONS

Japanese Office Action issued in Japanese Application No. 2009-057050 on Jun. 14, 2011 (with partial translation).
International Search Report issued in International Application No. PCT/JP2009/067180 on Oct. 27, 2009 (with translation).

* cited by examiner

*Primary Examiner* — Thomas Tarcza
*Assistant Examiner* — Alex C Dunn
(74) *Attorney, Agent, or Firm* — Oliff & Berridge, PLC (57) ABSTRACT

A vehicular electric power source control device provided on a vehicle provided with an engine that may be stopped even in a vehicle drivable state which is established when a predetermined condition is satisfied and in which a vehicle drive force can be generated, and an electric-energy storage device which is charged by an operation of said engine, the vehicular electric power source control device permitting implementation of an automatic engine starting control to start said engine when an amount of an electric energy stored in said electric-energy storage device has been reduced to or below a predetermined charging start threshold value while the engine is held at rest in said vehicle drivable state, the vehicle electric power source control device includes an engine start permitting portion configured to permit the implementation of said automatic engine starting control under a condition that any passenger is present within the vehicle.

5 Claims, 5 Drawing Sheets

VEHICULAR ELECTRIC POWER SOURCE CONTROL DEVICE

TECHNICAL FIELD

The present invention relates to a technique for automatically starting an engine of a vehicle.

BACKGROUND ART

There is known an engine start control device for a vehicle provided with an engine that is automatically stopped when a predetermined engine stopping condition is satisfied. The engine start control device is configured to re-start the automatically stopped engine when a predetermined engine re-starting condition is satisfied. This vehicle is provided with a vehicular electric power source control device as disclosed in Patent Document 1, in addition to the engine start control device. This vehicular electric power source control device is configured to inhibit the re-starting of the engine when a parking position is selected as a shift position, even while the predetermined engine re-starting condition is satisfied. The vehicular electric power source control device disclosed in Patent Document 1 is further configured to limit an electric power supply to electronic devices connected to an electric energy storage device, and other electric loads, for restricting an amount of consumption of an electric energy, when a stored amount of the electric energy in an electric-energy storage device mounted on the vehicle falls below a predetermined lower limit value, while the re-starting of the engine is inhibited.

PRIOR ART DOCUMENT

Patent Document 1: JP-11-343892 A

SUMMARY OF THE INVENTION

Object Achieved by the Invention

The vehicular electric power source control device disclosed in Patent Document 1 is certainly able to restrict an unnecessarily consumed amount of the electric energy stored in the electric energy storage device. However, this electric power source control device which restricts the electric power supply to the electronic devices and other electric loads has a risk of deterioration of convenience on the side of passengers of the vehicle, although this risk is not publicly recognized.

The present invention was made in view of the background art described above. It is therefore an object of the present invention to provide an electric power source control device for a vehicle provided with an engine temporarily stopped when a predetermined condition is satisfied, which electric power source control device permits an improvement in the convenience on the side of the passengers of the vehicle.

Means for Achieving the Object

The object indicated above is achieved according to the present invention, which provides a vehicular electric power source control device (a) provided on a vehicle provided with an engine that may be stopped even in a vehicle drivable state which is established when a predetermined condition is satisfied and in which a vehicle drive force can be generated, and an electric-energy storage device which is charged by an operation of the engine, the vehicular electric power source control device permitting implementation of an automatic engine starting control to start the above-described engine when an amount of an electric energy stored in the electric-energy storage device has been reduced to or below a predetermined charging start threshold value while the engine is held at rest in the above-described vehicle drivable state, (b) the vehicle electric power source control device permitting the implementation of the above-described automatic engine starting control under a condition that any passenger is present within the vehicle.

Advantages of the Invention

The electric power source control device constructed according to the present invention described above is configured to charge the above-described electric-energy storage device by implementing the above-described automatic engine starting control as needed, making it possible to eliminate a need of restricting an electric power supply from the electric-energy storage device to electronic devices, etc., maintain a suitable amount of electric energy in the electric-energy storage device and improve the convenience on the side of the passengers of the vehicle. The present electric power source control device is further configured to implement the above-described automatic engine starting control only when any passenger is present within the vehicle, so that a continued operation of the above-described engine contrary to an intention of the vehicle passenger after the implementation of the automatic engine starting control can be avoided. For example, the condition that the passenger is present within the vehicle can be detected by a seating sensor provided in each seat or an infrared radiation passenger sensor provided to detect any passenger within the vehicle.

It is preferable to inhibit the implementation of the above-described automatic engine starting control, irrespective of the amount of the electric energy stored in the above-described electric-energy storage device, if an electronic key for radio communication with the vehicle to place the above-described vehicle in the above-described vehicle drivable state is not located within the vehicle and if the above-described passenger is not present within the vehicle. In this case, it is possible to prevent starting of the above-described engine, contrary to an intention of the passenger.

It is also preferable to inhibit the implementation of the above-described automatic engine starting control, irrespective of the amount of the electric energy stored in the above-described electric-energy storage device, if a parking position for parking of the above-described vehicle is selected, if the above-described electronic key is not located within the vehicle, and if the above-described passenger is not present within the vehicle. In this case, it is possible to prevent starting of the above-described engine, contrary to the intention of the passenger. The intention of the passenger is accurately reflected by the selection of the parking position as the shift position, which is a requirement for the inhibition of the implementation of the above-described automatic engine starting control.

It is further preferable that (a) the above-described vehicle is provided with a vehicle control device for controlling accessory devices and a vehicle drive system, and (b) the above-described vehicle control device is turned off if a parking position for parking of the above-described vehicle is selected, if the above-described electronic key is not located within the vehicle, if at least a portion of the above-described vehicle control device is placed in an operated state, but not in the above-described vehicle drivable state, and if the amount of the electric energy stored in the above-described electric-energy storage device has been reduced to or below a lower limit value larger than the above-described charging start threshold value. In this case, the above-described vehicle control device can be turned off, without contradiction to the intention of the vehicle passenger, while the vehicle is not placed in the above-described vehicle drivable state. Accordingly, an amount of electric power consumption by the vehicle can be reduced while the vehicle control device is placed in the off state.

It is further preferable that the above-described power-source-position switching control portion turns off the above-described vehicle control device if the above-described parking position is selected, if the above-described electronic key is not located within the vehicle, if the vehicle is placed in the above-described vehicle drivable state, if the amount of the electric energy stored in the above-described electric-energy storage device has been reduced to or below the above-described charging start threshold value, and if the above-described passenger is not present within the vehicle. In this case, the above-described vehicle control device can be turned off, without contradiction to the intention of the vehicle passenger, while the vehicle is placed in the above-described vehicle drivable state. Accordingly, an amount of electric power consumption by the vehicle can be reduced while the vehicle control device is placed in the off state.

Preferably, the above-described vehicle is a hybrid vehicle provided with the above-described engine and a vehicle driving electric motor operatively connected to vehicle drive wheels. In this case, the amount of the electric energy stored in the above-described electric-energy storage device of the hybrid vehicle can be held at an adequate value, and the convenience on the side of the vehicle passenger can be improved.

It is further preferable that the electric power source control device effects radio communication with the above-described electronic key, to detect the electronic key located in an entire area within the vehicle or a predetermined area outside the vehicle. In this case, the location of the electronic key within the vehicle or outside the vehicle can be easily detected.

Preferably, the vehicle is provided with an operator-side door sensor capable of detecting open and closed states of an operator-side door. In this case, the detection of the open and closed states of the operator-side door is effected together with the detection of the location of the electronic key, so that the determination as to whether the electronic key exists within the vehicle or brought out of the vehicle can be easily made with a higher degree of accuracy.

BEST MODE FOR CARRYING OUT THE INVENTION

Figure 1:
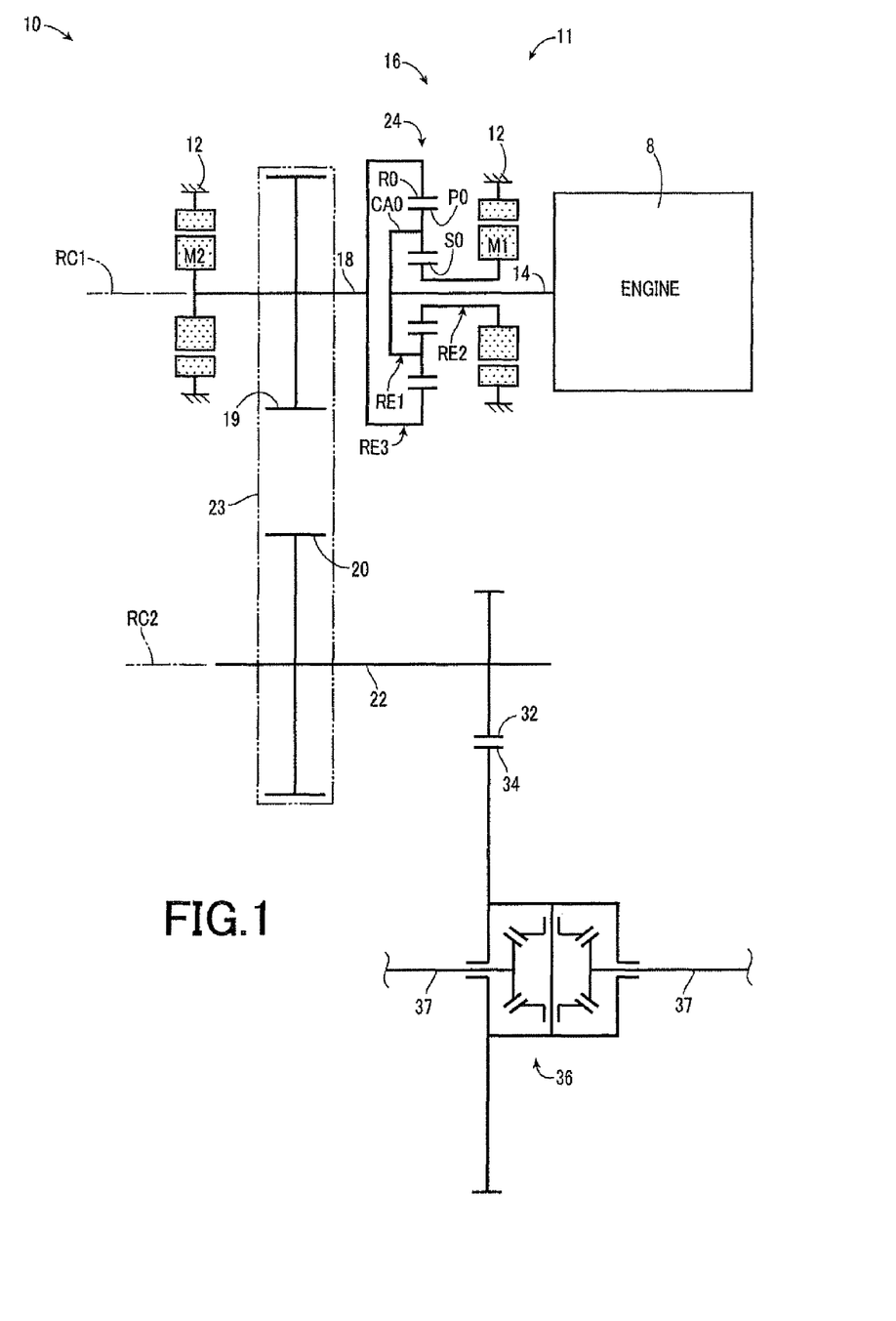
FIG. 1 is a schematic view for explaining a vehicular power transmitting system included in a vehicle to which the present invention is applicable.

An embodiment of the present invention will be described in detail by reference to the drawings.
Embodiment FIG. 1 is a schematic view for explaining a vehicular power transmitting system 10 (hereinafter referred to as "power transmitting system 10") included in a vehicle 6 to which the present invention is applicable. The vehicle 6 to which the present invention is applicable may be an ordinary engine-driven vehicle, but the present invention is preferably applicable to a hybrid vehicle. In this respect, the present embodiment will be described as applied to the hybrid vehicle 6. In FIG. 1, the power transmitting system 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting member 18 serving as an output rotary member of the differential portion 11; and a first counter gear 19 integrally connected to the power transmitting member 18. The input shaft 14, differential portion 11, power transmitting member 18 and first counter gear 19 are coaxially disposed on a first axis RC1 in a transmission casing 12 (hereinafter referred to as "casing 12") serving as a stationary member attached to a body of the vehicle. The power transmitting system 10 further includes: a second counter gear 20 which cooperates with the first counter gear 19 to constitute a counter gear pair; and a counter shaft in the form of an output shaft 22 integrally connected to the second counter gear 20 and serving as an output rotary member of the power transmitting system 10. The second counter gear 20 and output shaft 22 are coaxially disposed on a second axis RC2, which is parallel to the first axis RC1, in the casing 12. The power transmitting system 10 further includes a chain 23 which engages external teeth of the first and second counter gears 19 and 20, to effect power transmission between the first and second counter gears 19, 20. This power transmitting system 10 is suitably used for a longitudinal FF vehicle (front-engine, front-drive vehicle), for example, and is arranged to transmit a drive force from an internal combustion engine 8 to right and left drive wheels 38 (shown in FIG. 5) through a differential drive gear 32 connected to the output shaft 22 on the second axis RC2, a differential gear device (final speed reduction gear device) 36 having a differential ring gear 34 engaging the differential drive gear 32, and a pair of drive axles 37. The engine 8 may be a gasoline engine or diesel engine and serves as a vehicle drive power source connected to the input shaft 14 either directly or via the pulsation absorbing damper not shown.

The differential portion 11 is provided with: a first electric motor M1; a differential mechanism in the form of a power distributing mechanism 16 serving as a mechanism for mechanically distributing an output of the engine 8 received by the input shaft 14, to the first electric motor M1 and the power transmitting member 18; and a second electric motor M2 serving as a vehicle drive motor connected to the power transmitting member 18 so as to be integrally rotated with the power transmitting member 18. Each of the first and second electric motors M1 and M2 provided in this embodiment is a so-called motor/generator having also a function of an electric generator. The first and second electric motors M1 and M2 function as the electric generator when they generate a reaction torque acting in a direction in which the absolute value of their rotating speeds is lower.

The power distributing mechanism 16 is principally constituted by a differential-portion planetary gear set 24 of a single pinion type having a predetermined gear ratio $\rho 0$. This differential-portion planetary gear set 24 has rotary elements (elements) consisting of: a differential-portion sun gear S0; a differential-portion planetary gear P0; a differential-portion carrier CA0 supporting the differential-portion planetary gear P0 such that the differential-portion planetary gear P0 is rotatable about its axis and about the axis of the planetary gear set 24; and a differential-portion ring gear R0 meshing with the differential-portion sun gear S0 through the differential-portion planetary gear P0. Where the numbers of teeth of the differential-portion sun gear S0 and the differential-portion ring gear R0 are represented by ZS0 and ZR0, respectively, the above-indicated gear ratio $\rho 0$ is represented by ZS0/ZR0.

In the present power distributing mechanism 16, the differential-portion carrier CA0 is connected to the input shaft 14, that is, to the engine 8, and the differential-portion sun gear S0 is connected to the first electric motor M1, while the differential-portion ring gear R0 is connected to the power transmitting member 18. The thus constructed power distributing mechanism 16 is placed in a differential state in which three elements of the differential-portion planetary gear set 24 consisting of the differential-portion sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) is placed in a so-called continuously-variable shifting state (electrically established CVT state), in which the differential portion 11 is operated as an electrically controlled differential device and in which the rotating speed of the power transmitting member 18 is continuously variable, irrespective of the operating speed of the engine 8. Namely, the differential portion 11 functions as an electrically controlled continuously variable transmission a speed ratio $\gamma 0$ (rotating speed of the input shaft 14/rotating speed of the power transmitting member 18) is continuously variable from a minimum value $\gamma 0$ min to a maximum value $\gamma 0$ max. Thus, the differential state of the power distributing mechanism 16, that is, the differential state between the rotating speed of the input shaft 14 and the rotating speed of the power transmitting member 18 is controlled by controlling the operating states of the first and second electric motors M1, M2 operatively connected to the power distributing mechanism 16. When the first electric motor M1 is freely rotatable, power transmission path from the engine 8 to the drive wheels 38 is disconnected.

Figure 2:
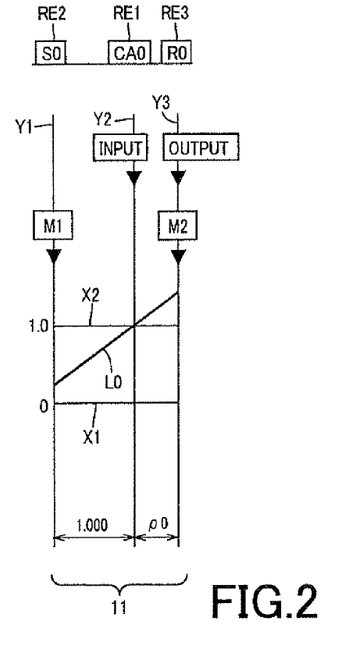
FIG. 2 is a collinear chart indicating, by straight lines, relative rotating speeds of rotary elements in the vehicular power transmitting system of FIG. 1.

FIG. 2 is a collinear chart indicating, by straight lines, a relationship among the rotating speeds of the rotary elements of the power transmitting system 10. The collinear chart of FIG. 2 is a rectangular two-dimensional coordinate system in which the gear ratios $\rho 0$ of the differential-portion planetary gear set 24 is taken along the horizontal axis, while the relative rotating speeds of the rotary elements are taken along the vertical axis. A horizontal line X1 indicates the rotating speed of 0, while a horizontal line X2 indicates the rotating speed of 1.0, that is, an operating speed $N_E$ of the engine 8 connected to the input shaft 14.

Three vertical lines Y1, Y2 and Y3 respectively corresponding to the three elements of the power distributing mechanism 16 of the differential portion 11 respectively represent the relative rotating speeds of a second rotary element (second element) RE2 in the form of the differential-portion sun gear S0, a first rotary element (first element) RE1 in the form of the differential-portion carrier CA0, and a third rotary element (third element) RE3 in the form of the differential-portion ring gear R0. The distances between the adjacent ones of the vertical lines Y1, Y2 and Y3 are determined by the gear ratio $\rho 0$ of the differential-portion planetary gear set 24. Described in detail, the distance between the sun gear and carrier corresponds to "1", while the distances between the carrier and ring gear correspond to the gear ratio $\rho$ of the planetary gear set. That is, the differential portion 11 is arranged such that the distance between the vertical lines Y1 and Y2 corresponds to "1", while the distance between the vertical lines Y2 and Y3 corresponds to the gear ratio $\rho 0$.

Referring to the collinear chart of FIG. 2, the power distributing mechanism 16 (differential portion 11) of the power transmitting system 10 in the present embodiment is arranged such that the first rotary element RE1 (differential-portion carrier CA0) of the differential-portion planetary gear set 24 is integrally fixed to the input shaft 14, that is, to the engine 8, and the second rotary element RE2 is fixed to the first electric motor M1, while the third rotary element RE3 (differential-portion ring gear R0) is fixed to the power transmitting member 18 and the second electric motor M2, so that a rotary motion of the input shaft 14 is transmitted to the drive wheels 38 through the power transmitting member 18. A relationship between the rotating speeds of the differential-portion sun gear S0 and the differential-portion ring gear R0 is represented by an inclined straight line L0 which passes a point of intersection between the lines Y2 and X2.

When the differential portion 11 is brought into the differential state in which the first rotary element RE1 through the third rotary element RE3 are rotatable relative to each other, for instance, the rotating speed of the differential-portion ring gear R0 represented by a point of intersection between the straight line L0 and the vertical line Y3 is held substantially constant at a value determined by a running speed V of the vehicle, the rotating speed of the differential-portion sun gear S0, that is, the rotating speed of the first electric motor M1, represented by a point of intersection between the straight line L0 and the vertical line Y1 is raised or lowered, by controlling a speed $N_E$ of the engine, when the rotating speed of the differential-portion carrier CA0 represented by a point of intersection between the straight line L0 and the vertical line Y2 is raised or lowered.

Figure 3:
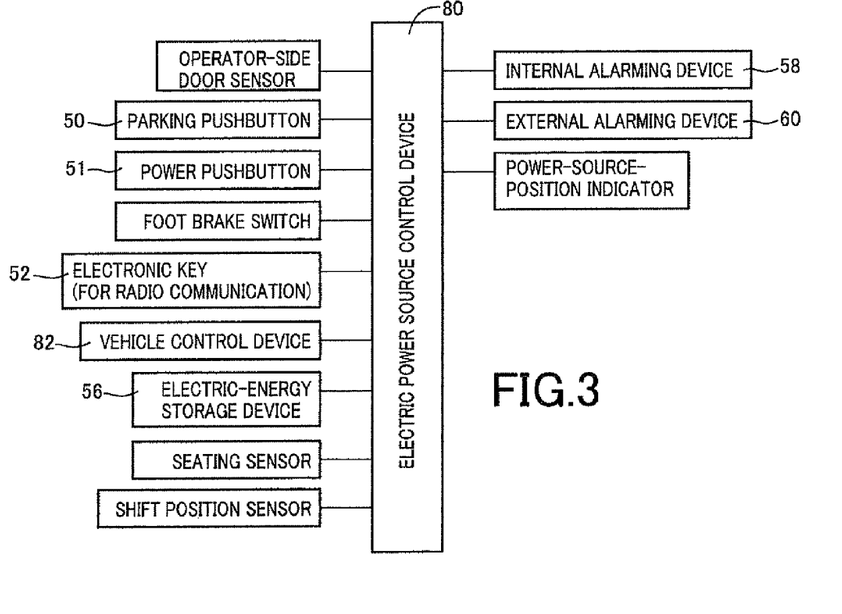
FIG. 3 is a view indicating signals received by and generated from an electric power source control device configured to effect electric power control of a vehicle control device provided to control the vehicular power transmitting system of FIG. 1.

FIG. 3 is a view indicating signals received by and generated from an electric power source control device 80 configured to effect electric power control of the vehicle 6 according to the present embodiment. This electric power source control device 80 is an electronic control device principally constituted by a so-called microcomputer which incorporates a CPU, a ROM, a RAM and an input/output interface. The electric power source control device 80 is configured to process the signals according to programs stored in the ROM while utilizing a temporary data storage function of the RAM, to effect the electric power control of a vehicle control device 82 provided on the vehicle 6, such that an entirety or a portion of the vehicle control device 82 is selectively placed in an operable state or an inoperable state. The vehicle control device 82 described above is an electronic control device provided to control accessory devices 84 (shown in FIG. 5) and a drive system of the vehicle 6. The accessory devices 84 may include, for example, a car navigation device, an audio device, and an electrically closable door-mirror system. The drive system of the vehicle 6 includes, for instance, the engine 8, first electric motor M1, second electric motor M2, wheel brakes, etc. which directly relate to driving of the drive wheels 38. The vehicle control device 82 includes an accessory-device control device 86 (shown in FIG. 5) to control the accessory devices 84, and a hybrid control device 88 (shown in FIG. 5) provided to implement hybrid driving controls of the engine 8 and electric motors M1, M2.

Figure 4:
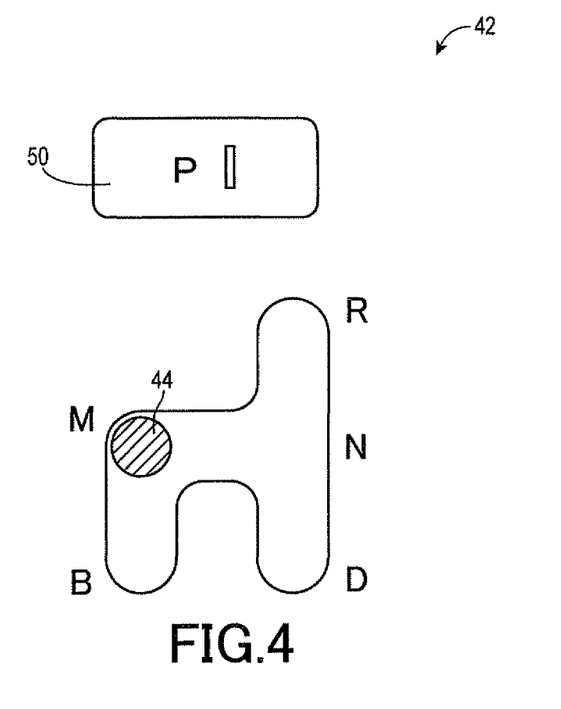
FIG. 4 is a view showing an example of a shifting device manually operable to select one of a plurality of shifting states of the vehicular power transmitting system of FIG. 1

The electric power source control device 80 is arranged to receive from various sensors and switches shown in FIG. 3, various signals such as: a signal which is received from an operator-side door sensor provided in an operator-side door to detect open and closed states of the operator-side door, and which indicates the open or closed state of the operator-side door; a signal indicative of an operated state of a parking pushbutton 50 (shown in FIG. 4); a signal indicative of an operated state of a power pushbutton 51 provided near an operator seat to select a power source position $P_{ES}$ indicative of a state of electric power supply to the vehicle control device 82; a signal indicative of an operated state of a foot brake; a signal which is received from an electronic key 52 by wireless communication with the vehicle 6 to change the above-indicated power source position $P_{ES}$ of the vehicle 6; various signals which are received from the vehicle control device 82, and which indicate the selected shift position, the operating state of the engine 8, etc.; a signal indicative of an electric energy amount SOC stored in an electric-energy storage device 56; a signal received from a seating sensor which is provided on each seat and which is turned on when a passenger is seated on the seat; and an output signal of a shift position sensor provided to detect a selected shift position $P_{SH}$ of a shift lever 44 (shown in FIG. 4).

The electric power source control device 80 is further arranged to generate various signals such as a signal to change the state of electric power supply to the vehicle control device 82 to change the operating state of the vehicle control device 82; a signal to actuate an internal alarming device 58 for generating an alarming sound within the vehicle compartment; a signal to actuate an external alarming device 60 for generating an alarming sound outside of the vehicle compartment; a signal to actuate a power-source-position indicator provided near the operator's seat to indicate the above-indicated power source position $P_{ES}$; and a signal to be transmitted by radio communication to the electronic key 52.

The vehicle 6 according to the present embodiment employs a so-called "smart start" system to start and drive the vehicle 6 when the presence of a portable radio communication terminal within the vehicle 6 is detected, without having to insert an ignition key in a key slot disposed near the operator's seat. The above-described electronic key 52 serves as this portable radio communication terminal. The vehicle 6 is arranged such that the electronic key 52 is detectable within a predetermined detectable area which may consist of, for example, an entire area of the vehicle compartment, and selected areas outside the vehicle, which are near the doors and a rear luggage compartment. The electric power source control device 80 is configured to effect radio communication with the electronic key 52 located within the above-described predetermined detectable area, while implementing ID verification, to determine the position of the electronic key 52 within the detectable area, for instance, to determine whether the electronic key 52 is located within the detectable area and within the vehicle compartment.

The power source position $P_{ES}$ described above corresponds to a selected one of the operating states of the above-indicated ignition key, and indicates a selected one of an Off state, an Acc state, an On state and a Ready-on state, which correspond to those of the ignition key. In the Off state, the vehicle control device 82 is placed in the inoperable state, with inhibition of the electric power supply to the vehicle control device 82, except a standby power supply, for example. In the Acc state, only the accessory-device control device 86 that is a portion of the vehicle control device 82 is placed in the operable state, with inhibition of the electric power supply to the portion of the vehicle control device 82 other than the accessory-device control device 86, except a standby power supply, for example. In the On state, the entirety of the vehicle control device 82 is placed in the operable state, with the electric power supply to the entire portion of the vehicle control device 82. In the On state, however, the engine 8 and the electric motors M1, M2 are placed in non-driving state where none of the engine 8 and the electric motors M1, M2 are operable to generate a vehicle drive force by operation of an accelerator pedal. In the Ready-on state, the entirety of the vehicle control device 82 is placed in the operable state as in the On state, and in addition at least one of the engine 8 and the electric motors M1, M2 is operable by operation of the accelerator pedal, to establish a vehicle drivable state in which the vehicle can be started. The selection of the Read-on state is indicated on the above-described power-source-position indicator. It will be understood from the foregoing description that the Acc state and the On states are not the above-described vehicle drivable state (Ready-on state) in which a vehicle drive force can be generated, but at least a portion of the vehicle control device 82 is placed in an operated state.

FIG. 4 is a view showing an example of a shifting device 42, serving as a switching device, manually operable to select one of a plurality of shifting states of the power transmitting system 10. This shifting device 42 is disposed neat the operator's seat, for example, and includes the shift lever 44 manually operable to a selected one of the plurality of shift positions $P_{SH}$, and the parking pushbutton 50 provided to select the parking state (P position: parking position) for locking the vehicle 6 (power transmitting system 10) in the parking state.

As indicated in FIG. 4, the shift lever 44 is manually operable to a selected one of: three shift positions $P_{SH}$ consisting of an R position, an N position and a D position that are arranged in a back-and-forth or vertical direction, namely, a longitudinal direction of the vehicle 6; and an M position and a B position that are arranged in parallel with the direction of arrangement of the R, N and D positions. The shift lever 44 is operable in the longitudinal direction to select one of the R, N and D positions, and to select one of the M and B positions, and is operable in a lateral direction of the vehicle 6 perpendicular to the above-indicated longitudinal direction, to select one of the N and B positions.

When the parking pushbutton 50 described above is pressed, the parking state (P position) for parking the vehicle 6 is established if the predetermined condition is satisfied, for instance, if a foot brake pedal is depressed while the vehicle 6 is held stationary. In the parking state, the power transmission path through the power transmitting system 10 is disconnected, that is, the first electric motor M1 and the second electric motor M2 are freely rotatable, while at the same time the power transmitting system 10 is placed in a parking lock state to mechanically prevent a rotary motion of the drive wheels 38 with a parking lock mechanism not shown.

The M position of the shifting device 42 is an initial position (home position) of the shift lever 44. Namely, the shift lever 44 placed in one of the shift positions $P_{SH}$ other than the M position (that is, in one of the R, N, D and B positions) is returned to the M position by a spring or other mechanism when the operator releases the shift lever 44, that is, when an external force acting on the shift lever 44 is removed.

After the shifting device 42 is shifted to a selected one of the shift positions $P_{SH}$, the shifting state corresponding to the selected shift position $P_{SH}$. The shifting states corresponding to the shift positions $P_{SH}$ will be described. When the shift lever 44 (shifting device 42) is operated to the R position, a rear-drive state for transmitting a vehicle drive force to the drive wheels 38 to run the vehicle 6 in the rearward direction is established. When the shift lever 44 is operated to the N position, a neutral state (N state) for disconnecting the power transmission path through the power transmitting system 10 is established. When the shift lever 44 is operated to the D position, a forward-drive state for transmitting the vehicle drive force to the drive wheels 38 to run the vehicle 6 in the forward direction is established. When the shift lever 44 is operated from the P position to one of the shift positions $P_{SH}$ for releasing the motion locking (the parking lock) of the vehicle 6 (more specifically, to the R, N or D position), the above-described parking lock is released, and the shifting state corresponding to the selected shift position $P_{SH}$ is established.

When the shift lever 44 is operated to the B position, an engine-braking forward-drive state is established for applying an engine brake to the drive wheels 38 to decelerate the drive wheels 38 with a regenerative torque produced by the second electric motor M2, for example. Therefore, if the shift lever 44 is operated to the B position from the shift position other than the D position, this operation of the shift lever 44 to the B position is invalid. Only the operation of the shift lever 44 to the B position from the D position is valid. Namely, the operation of the shift lever 44 to the B position from the P position, the parking state is maintained.

Since the shifting device 42 is configured to return the shift lever 44 to the M position, the presently established shifting state cannot be correctly recognized by merely observing the presently selected shift position PSH. In view of this fact, a shift indicator (shifting-state display device) is provided at an easily visible position, so that the presently established shifting state (including the parking state) is indicated on this shift indicator.

The vehicle 6 (power transmitting system 10) according to the present embodiment employs a so-called "shift by wire" system wherein the presently selected shift position PSH is detected by a shift position sensor built in the shifting device 42. For dealing with an erroneous operation of the shift lever 44, the shifting state corresponding to the shift position $P_{SH}$ to which the shift lever 44 has been operated is not established immediately after this operation of the shift lever 44. The operation of the shift lever 44 to the selected shift position $P_{SH}$ is determined as a valid shifting operation of the shift lever 44 only after the shift lever 44 is kept in the selected shift position $P_{SH}$ for at least a predetermined length of time predetermined for each shift position $P_{SH}$ or each shifting state, and the shifting state corresponding to the shift position $P_{SH}$ selected by this valid shifting operation is established.

Figure 5:
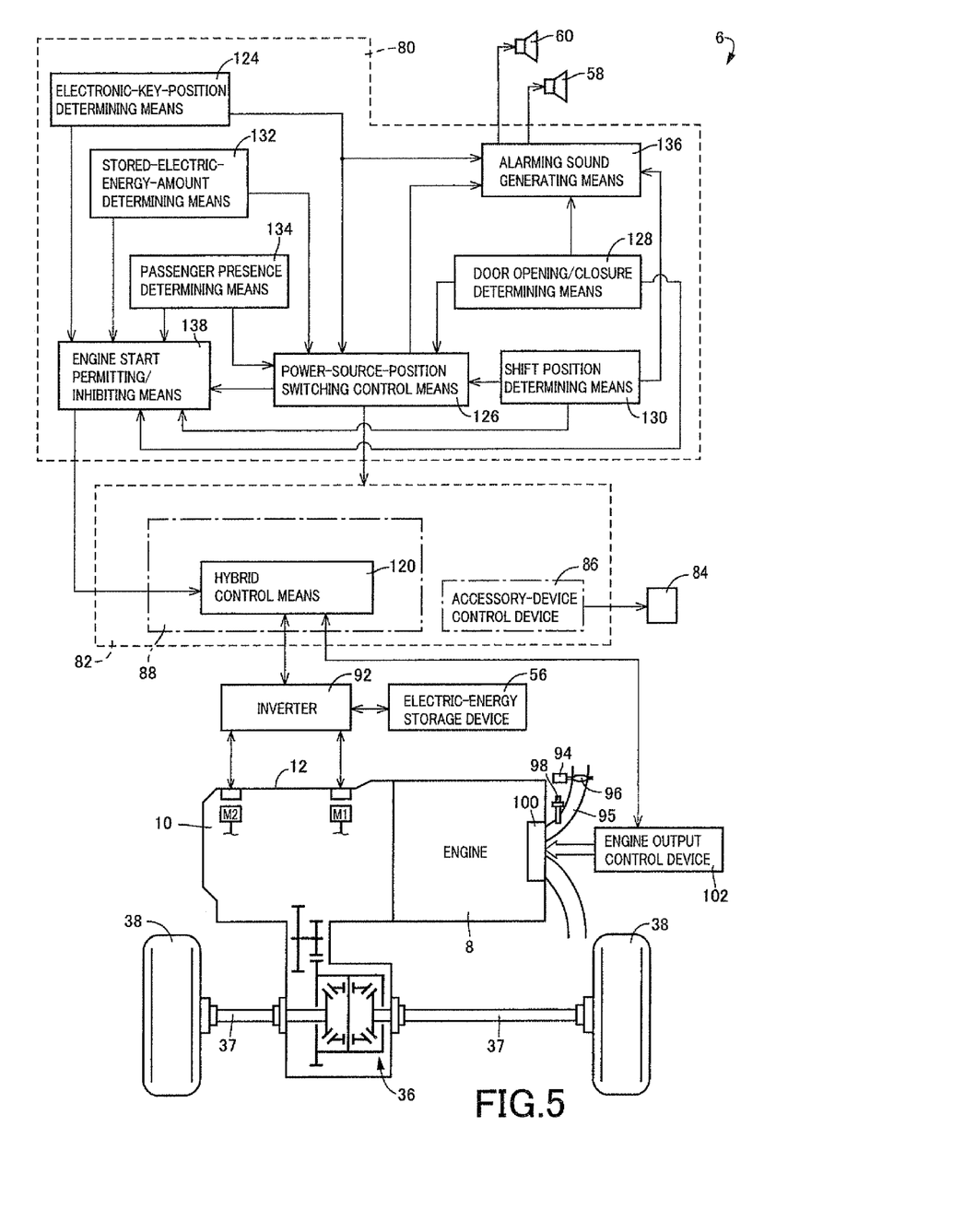
FIG. 5 is a functional block diagram illustrating major control functions of the vehicle control device provided to control the vehicular power transmitting system of FIG. 1 and the electric power source control device of FIG. 3.

FIG. 5 is a functional block diagram for explaining major control functions of the electronic control devices for the vehicle 6 in the form of the electric power source control device 80 and the hybrid control device 88. In FIG. 5, hybrid control means 120 included in the hybrid control device 88 is configured to control the engine 8 to be operated in an operating range of high efficiency, and to control the speed ratio γ0 of the differential portion 11 operating as the electrically controlled continuously variable transmission, by optimizing a proportion of drive forces generated by the engine 8 and the second electric motor M2, and a reaction force generated by the first electric motor M1 during its operation as the electric generator. For instance, the hybrid control means 120 calculates a target (required) output of the vehicle. 6 at the present running speed V of the vehicle 6, on the basis of an operation amount $RT_{AC}$ of the accelerator pedal used as an operator's required vehicle output, and the vehicle running speed V, and calculate a target total vehicle output on the basis of the calculated target output of the vehicle 6 and a required amount of charging of the electric-energy storage device. Then, the hybrid control means 120 calculates a target engine output to obtain the calculated target total vehicle output, while taking account of a power transmission loss, a load acting on various optional devices of the vehicle, an assisting torque to be generated by the second electric motor M2, etc. The hybrid control means 120 controls the engine 8 and the amount of generation of the electric energy by the first electric motor M1, such that the speed $N_E$ and torque $T_E$ of the engine 8 are controlled to obtain the calculated target engine output.

Namely, the hybrid control means 120 determines a target value of the speed ratio γ0 of the differential portion 11 so that the engine 8 is operated such that an operating point of the engine 8 follows a stored well known highest-fuel-economy curve (fuel-economy map or relation) of the engine 8, which is obtained by experimentation so as to satisfy both of the desired operating efficiency and the highest fuel economy of the engine 8 in the continuously-variable shifting state, and which is defined in a two-dimensional coordinate system defined by an axis of the engine speed $N_E$ and an axis of the torque $T_E$ of the engine 8 (engine torque $T_E$). For instance, the hybrid control means 120 determines the target value of speed ratio γ0 of the differential portion 11 such that the engine torque $T_E$ and engine speed $N_E$ are controlled to obtain an engine output required for the target output (target total vehicle output: required vehicle drive force), and controls the speed ratio γ0 continuously within a predetermined range, to obtain the determined target value.

At the same time, the hybrid control means 120 controls an inverter 92 such that the electric energy generated by the first electric motor M1 is supplied to the electric-energy storage device 56 and the second electric motor M2 through the inverter 92. That is, a major portion of the drive force produced by the engine 8 is mechanically transmitted to the first counter gear 19, while the remaining portion of the drive force is consumed by the first electric motor M1 to convert this portion into the electric energy, which is supplied through the inverter 92 to the second electric motor M2, so that the second electric motor M2 is operated with the supplied electric energy, to produce a mechanical energy to be transmitted to the first counter gear 19. Thus, the devices relating to an operation from the generation of the electric energy to the consumption of the electric energy by the second electric motor M2 constitute an electric path through which the electric energy generated by conversion of a portion of the drive force of the engine 8 is converted into a mechanical energy. The electric-energy storage device 56 is an electric energy source as a lead acid battery or any other type of battery, or a capacitor, which is able to supply the first and second electric motors M1, M2 with an electric energy and to be charged with the electric energy supplied from the first electric and second electric motors M1, M2. The electric-energy storage device 56 is also used to supply an electric energy to the electronic control devices such as the electric power source control device 80 and the vehicle control device 82.

The hybrid control means 120 is further configured to hold the engine speed $N_E$ substantially constant or at a desired value owing to an electric CVT function of the power transmitting system 10, by controlling an operating speed $N_{M1}$ of the first electric motor M1 (hereinafter referred to as first electric motor speed $N_{M1}$), for example, irrespective of whether the vehicle 6 is stationary or running. That is, the hybrid control means 120 controls the first electric motor M1 so as to operate the engine 8, such that the first electric motor M1 operatively connected to the input shaft 14 (output shaft of the engine 8) through the differential-portion planetary gear set 24 functions as a drive device operable to transmit a vehicle drive force to the input shaft 14. For example, the hybrid control means 120 is configured to raise the engine speed $N_E$ during running of the vehicle, by raising the first electric motor speed $N_{M1}$ while an output shaft speed $N_{OUT}$ determined by the vehicle speed V (rotating speed of the drive wheels 38) is held substantially constant.

The hybrid control means 120 includes engine output control means functioning to command an engine output control device 102 to control the engine 8, so as to provide a required output, by controlling a throttle actuator 94 to open and close an electronic throttle valve 96 provided with intake 95 of the engine 8, and controlling an amount and time of fuel injection by a fuel injection device 98, and/or the timing of ignition by an ignition device 100, alone or in combination. For instance, the hybrid control means 120 is basically configured to control the throttle actuator 94 on the basis of the accelerator pedal operation amount $RT_{AC}$ and according to a predetermined stored relationship (not shown) between the accelerator pedal operation amount $RT_{AC}$ and an opening angle $\theta_{TH}$ of the electronic throttle valve 96, such that the opening angle $\theta_{TH}$ increases with an increase of the accelerator pedal operation amount $RT_{AC}$. According to a command from the hybrid control means 120, the engine output control device 102 controls the engine torque by controlling the throttle actuator 94 to open and close the electronic throttle valve 96, and controlling the fuel ignition by the fuel injection device 98, and the ignition timing of the ignition device 100.

The hybrid control means 120 is further configured to establish a motor drive mode (EV drive mode) in which only the second electric motor M2 is operated as a vehicle drive power source, with an electric energy supplied from the electric-energy storage device 56, while the engine 8 is held at rest. For example, the EV drive mode is generally established by the hybrid control means 120, when a vehicle output torque $T_{OUT}$ is in a comparatively low range in which the engine efficiency is comparatively low relative to high-torque region, namely, when the engine torque $T_E$ is in a comparatively low range, or when the vehicle speed V is in a comparatively low range, that is, when the vehicle load is comparatively low.

For preventing a dragging of the engine 8 in its non-operated state and improving the fuel economy in the EV drive mode, the hybrid control means 120 is configured to hold the engine speed $N_E$ at zero or substantially zero, as needed, owing to the electric CVT function (differential function) of the power transmitting system 10, by placing the first electric motor M1 in its non-load or freely rotatable state, for example. Namely, the hybrid control means 120 not only holds the engine 8 in its non-operated state, but also prevents a dragging operation of the engine 8, in the EV drive mode. The hybrid control means 120 is further configured to stop the operation of the engine 8 for further improve fuel-efficiency, when a predetermined engine stopping condition is satisfied, for example, when the vehicle 6 is held stationary for more than a predetermined period of time. Thus, the engine 8 in the present embodiment can be considered to be a vehicle drive power source which may be stopped even in the above-described vehicle drivable state (Ready-on state).

The hybrid control means 120 also includes engine start control means functioning to start the engine 8 while the vehicle is stationary or running in the EV drive mode. For instance, the hybrid control means 120 commands the first electric motor M1 to operate as an engine starter, for raising the engine speed $N_E$ to a point higher than a predetermined value $N_E'$ at which a fuel-air mixture can be exploded, for example, to a point higher than an idling speed at which the engine 8 can be kept operated by itself. After the engine speed $N_E$ has been raised to the predetermined value $N_E'$, such as an engine rotation speed which is larger than or equal to an idle rotation speed where the engine 8 may rotate autonomously, the hybrid control means 120 commands the fuel injection device 98 to supply the engine 8 with the fuel, and commands the ignition device 100 to start the engine 8.

The hybrid control means 120 is further configured to establish a so-called "torque assisting" mode in which the engine 8 operated as a vehicle drive power source in the engine drive mode is assisted by the second electric motor M2 operated to drive the drive wheels 38, with an electric energy supplied from the first electric motor M1 through the electric path described above and/or the electric-energy storage device 56. Thus, the drive wheels 38 are driven by only the output of the engine 8, both of the output of the engine 8 and the output of the second electric motor M2, or only the output of the second electric motor M2.

The hybrid control means 120 is further configured to place the first electric motor M1 in the non-load freely rotatable state, for thereby preventing power transmission through the power transmitting system 10, that is, for establishing a state in which the power transmission path through the power transmitting system 10 is disconnected, and to also place the second electric motor M2 in the non-load state to prevent the power transmitting system 10 from providing an output. Namely, the hybrid control means 120 can place the power transmitting system 10 in its neutral state by placing the electric motors M1, M2 in the non-load state.

The hybrid control means 120 functions as regenerative brake control means for performing a so-called "regenerative braking" operation while the vehicle 6 is being decelerated during the accelerator being off or braked. In the regenerative braking operation, the first electric motor M1 or the second electric motor M2 is operated as an electric generator with a kinetic energy of the running vehicle 6, that is, with a reverse drive force transmitted from the drive wheels 38 toward the second electric motor M2, and an electric energy or electric current generated by the electric motor M1, M2 is stored in the electric-energy storage device 56 through the inverter 92.

The electric power source control device 80 includes electronic-key-position determining means 124, power-source-position switching control means 126, door opening/closure determining means 128, shift position determining means 130, stored-electric-energy-amount determining means 132, passenger presence determining means 134, alarming sound generating means 136 and engine start permitting/inhibiting means 138.

The electronic-key-position determining means 124 is configured to detect the position of the electronic key 52, and to determine whether the electronic key 52 is located within the vehicle or outside the vehicle. When the electronic key 52 is not detected within the above-described predetermined detectable area, the electronic-key-position determining means 124 determines that the electronic key 52 is located outside the vehicle.

The power-source-position switching control means 126 is configured to change the power source position $P_{ES}$ on the basis of manual operations, and to automatically change the power source position $P_{ES}$ under a predetermined condition. This power-source-position switching control means 126 also functions as power-source-position determining means for determining the selected power source positions $P_{ES}$.

When the electronic-key-position determining means 124 has determined that the electronic key 52 is located within the vehicle, the power-source-position switching means 126 changes the power source position $P_{ES}$ on the basis of manual operations, which are operations of the above-described power pushbutton 51 and the foot brake pedal, for example. When the power pushbutton 51 is pressed while the foot brake pedal is depressed, the power-source-position switching means 126 changes the power source position $P_{ES}$ from the presently established one of the Off state, Acc state and On state to the Ready-on state, after a predetermined system check is implemented. If the Ready-on state is presently established as the power source position $P_{ES}$, the power-source-position switching control means 126 changes the power source position PBS to the Off state. While the foot brake pedal is not depressed, the power-source-position switching control means 126 changes the power source position $P_{ES}$ sequentially to the Off state, Acc state and On state each time the power pushbutton 51 is pressed. If the On state or Ready-on state is presently established as the power source position $P_{ES}$, the power-source-position switching control means 126 changes the power source position $P_{ES}$ to the Off state.

As is apparent from the foregoing description, the Ready-on state, that is, the above-described vehicle drivable state is established when a predetermined condition is satisfied. For example, the Ready-on state is established when the power pushbutton 51 is pressed while the electronic key 52 is present within the vehicle and while the above-described foot brake pedal is depressed, and when the vehicle has passed the above-described system check. Thus, the presence of the electronic key 52 within the vehicle 6 can be considered essential for placing the vehicle 6 in the above-described vehicle drivable state (Ready-on state), by radio communication with the vehicle 6.

The door opening/closure determining means 128 is configured to determine whether the operator-side door of the vehicle 6 has been opened or not. For instance, the door opening/closure determining means 128 makes this determination on the basis of the output signal of the above-described operator-side door sensor. If the above-described operator-side door is closed after it has been once opened, the door opening/closure determining means 128 maintains its determination that the operator-side door has been opened, if the electronic key 52 is located outside the vehicle.

The shift-position determining means 130 is configured to determine a presently selected or established one of the shift positions P, R, N, D and B of the vehicle 6 (power transmitting system 10).

The stored-electric-energy-amount determining means 132 is configured to detect the electric energy amount SOC stored in the electric-energy storage device 56, and determine whether the detected stored electric energy amount SOC has been reduced to or below a predetermined charging start threshold value $A1_{SOC}$. This charging start threshold value $A1_{SOC}$ is used to determine whether the electric-energy storage device 56 is required to be charged by an operation of the engine 8, and is obtained by experimentation, as a lower limit of the stored electric energy amount SOC required to maintain the Ready-on state, for example. The charging start threshold value $A1_{SOC}$ is stored in the stored-electric-energy-amount determining means 132.

The stored-electric-energy-amount determining means 132 is further configured to determine whether the above-described stored electric energy amount SOC has been reduced to or below a predetermined lower limit value $A2_{SOC}$. This lower limit value $A2_{SOC}$ is larger than the above-described charging start threshold value $A1_{SOC}$, and is obtained by experimentation, as a threshold value below which the power source position $P_{ES}$ should be switched to the Off state to prevent electric energy consumption by the vehicle control device 82, etc. while the engine 8 is held at rest. The lower limit value $A2_{SOC}$ is stored in the stored-electric-energy-amount determining means 132.

The passenger presence determining means 134 is configured to determine whether any passenger is present within the vehicle. This determination is made on the basis of the output signal of the above-described seating sensor. An infrared radiation passenger sensor for detecting a passenger or passengers may be provided within the vehicle 6. In this case, the determination as to whether the passenger (s) is/are present within the vehicle is made on the basis of an output signal of the infrared radiation passenger sensor.

The alarming sound generating means 136 is configured to activate the internal alarming device 58 to generate continuously a suitable internal alarming sound, if the door opening/closure determining means 128 determines that the operator-side door of the vehicle 6 has been opened and the power-source-position switching control means 126 has switched the power source position $P_{ES}$ to one of the Acc, On and Ready-on states, while the shift-position determining means 130 determines that one of the N, D and B positions has been selected as the shift position. If the electronic-key-position determining means 124 determines that the electronic key 52 is located outside the vehicle, in the above-indicated condition, the alarming sound generating means 136 also activates the external alarming device 60 to generate continuously a suitable external alarming sound, while at the same time the above-described internal alarming sound is continuously generated. When the P position is selected as the shift position in the above-indicated condition, the alarming sound generating means 136 stops the above-indicated continuous internal alarming sound and continuous external alarming sound.

The alarming sound generating means 136 is further configured to activate the internal alarming device 58 to generate continuously the suitable internal alarming sound, if the door opening/closure determining means 128 determines that the operator-side door of the vehicle 6 has been opened and the shift-position determining means 130 determines that the P position has been selected as the shift position, while the power-source-position switching control means 126 has switched the power source position $P_{ES}$ to the Acc state. The alarming sound generating means 136 stops the above-indicated continuous internal alarming sound if the operator-side door has been closed or if the power source position $P_{ES}$ has been switched to the shifting state other than the Acc state.

The alarming sound generating means 136 is further configured to activate the internal alarming device 58 to generate a suitable internal alarming sound only once and activate the external alarming device 60 to generate a suitable external alarming sound three times, if the door opening/closure determining means 128 determines that the operator-side door of the vehicle 6 has been opened, if the shift-position determining means 130 determines that the P position has been selected as the shift position, if the power-source-position switching control means 126 has switched the power source position $P_{ES}$ to the On or Ready-on state, and if the electronic-key-position determining means 124 determines that the electronic key 52 is located outside the vehicle.

The engine start permitting/inhibiting means 138 is configured to permit the hybrid control means 120 to implement an automatic engine starting control if a predetermined engine start permitting condition is satisfied while the engine 8 is held at rest. The hybrid control means 120 functioning as the engine start control means as described above implement the automatic engine starting control to start the engine 8 when this automatic engine starting control is permitted.

The permission to implement the above-indicated automatic engine starting control will be described in detail. The engine start permitting/inhibiting means 138 permits the implementation of the automatic engine starting control, if the door opening/closure determining means 128 determines that the operator-side door of the vehicle 6 has been opened, if the shift-position determining means 130 determines that the P position has been selected as the shift position, if the power-source-position switching control means 126 has switched the power source position $P_{ES}$ to the Ready-on state, if the stored-electric-energy-amount determining means 132 determines that the electric energy amount SOC stored in the electric-energy storage device 56 has been reduced to or below the above-indicated charging start threshold value $A1_{SOC}$, and if the passenger presence determining means 134 determines that any passenger is present within the vehicle.

On the other hand, the engine start permitting/inhibiting means 138 inhibits the implementation of the above-described automatic engine starting control, even when the Read-on state is selected as the power source position $P_{ES}$, irrespective of the electric energy amount SOC stored in the electric-energy storage device 56, if the shift-position determining means 130 determines that the P position is selected as the shift position, if the electronic-key-position determining means 124 determines that the electronic key 52 is located outside the vehicle, and if the passenger presence determining means 134 determines that any passenger is not present within the vehicle. When the implementation of the automatic engine starting control is inhibited, the hybrid control means 120 does not implement the automatic engine starting control, so that the engine 8 is held at rest.

As described above, the engine start permitting/inhibiting means 138 permits the implementation of the above-indicated automatic engine starting control, on the basis of results of the determinations by the door opening/closure determining means 128 and the shift-position determining means 130. However, it is not essential for the engine permitting/inhibiting means 130 to permit the implementation on the basis of the results of the determinations by the door opening/closure determining means 128 and the shift-position determining means 130. While the engine start permitting/inhibiting means 138 inhibits the implementation of the automatic engine starting control on the basis of a result of the determination by the shift-position determining means 130, it is not essential for the engine start permitting/inhibiting means 138 to inhibit the implementation on the basis of the result of the determination by the shift-position determining means 130.

The power-source-position switching control means 126 having the function described above has a further function to automatically switch the power source position $P_{ES}$ from one of the Acc, On and Ready-on states to the Off state, if a predetermined condition is satisfied. The predetermined condition that should be satisfied to switch the power source position $P_{ES}$ from the Acc or On state to the Off state is different from the predetermined condition that should be satisfied to switch the power source position $P_{ES}$ from the Read-on state to the Off state. Described more specifically, the power-source-position switching control means 126 switches the power source position $P_{ES}$ from the presently established Acc or On state to the Off state automatically, that is, turns off the vehicle control device 82, if the shift-position determining means 130 determines that the P position has been selected as the shift position, if the electronic-key-position determining means 124 determines that the electronic key 52 is located outside the vehicle, and if the stored-electric-energy-amount determining means 132 determines that the electric energy amount SOC stored in the electric-energy storage device 56 has been reduced to or below the above-indicated lower limit value $A1_{SOC}$. In this respect, it is noted that the power source position $P_{ES}$ may not be switched from the Acc state to the Off state, namely, may remain in the Acc state.

On the other hand, the power-source-position switching control means 126 switches the power source position $P_{ES}$ from the presently established Ready-on state to the Off state, that is, cancels the above-described vehicle drivable state to turn off the vehicle control device 82, if the shift-position determining means 130 determines that the P position has been selected as the shift position, if the electronic-key-position determining means 124 determines that the electronic key 52 is located outside the vehicle, if the stored-electric-energy-amount determining means 132 determines that the electric energy amount SOC stored in the electric-energy storage device 56 has been reduced to or below the above-indicated charging start threshold value $A1_{SOC}$, and if the passenger presence determining means 134 determines that any passenger is not present within the vehicle.

Figure 6:
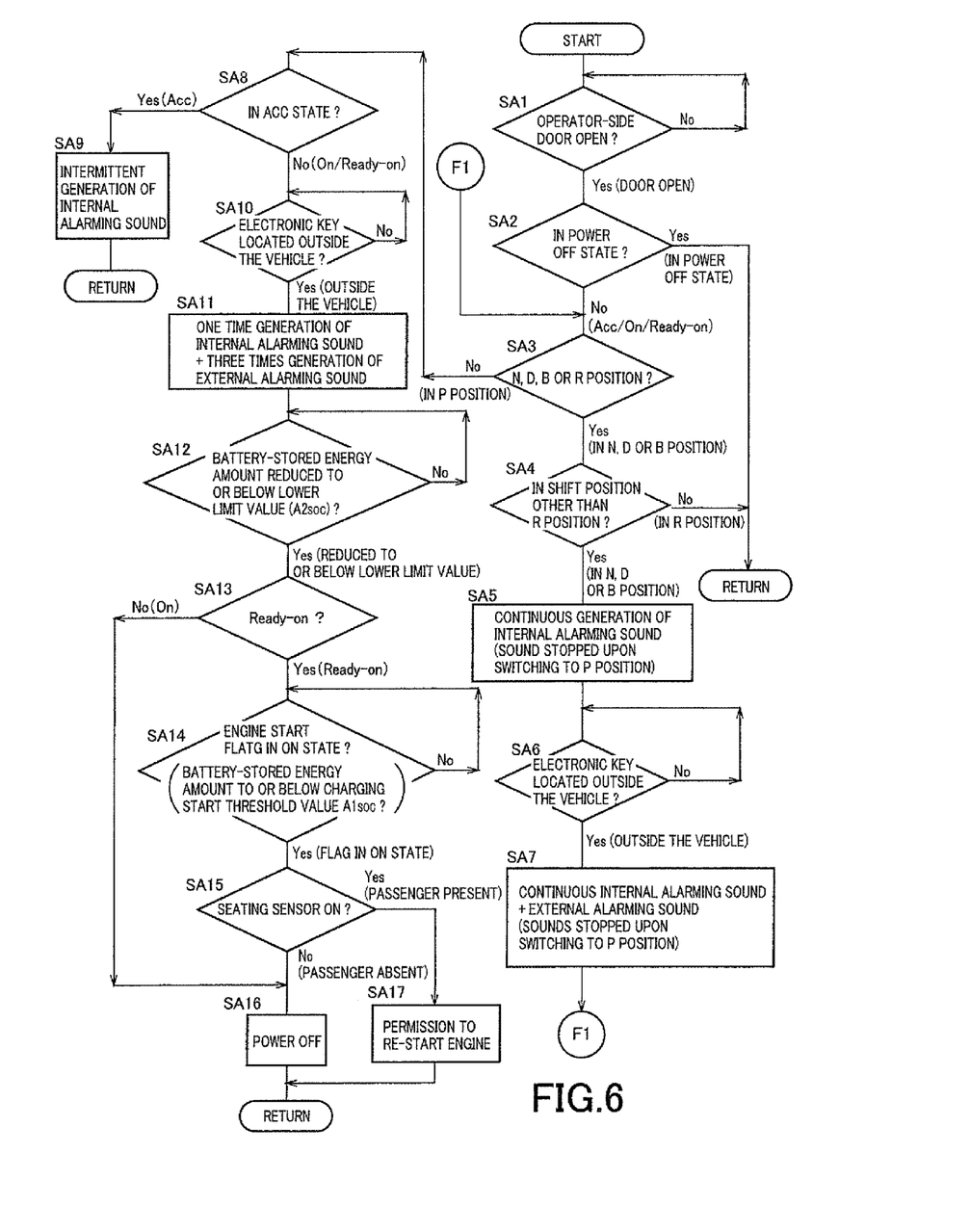
FIG. 6 is a flow chart illustrating a major control operation of the electric power source control device of FIG. 5, namely, a control operation performed to re-start an engine once stopped while the vehicle is stationary.

FIG. 6 is a flow chart illustrating a major control operation of the electric power source control device 80, namely, a control operation performed to re-start the engine 8 once stopped while the vehicle 6 is stationary. This control operation is repeatedly performed with an extremely short cycle time of about several milliseconds to about several tens of milliseconds.

Initially, step (hereinafter "step" being omitted) SA1 corresponding to the door opening/closure determining means 128 is implemented to determine whether the operator-side door of the vehicle 6 has been opened. If an affirmative determination is obtained in SA1, that is, if the above-indicated operator-side door has been opened, the control flow goes to SA2 and subsequent steps. If the above-indicated operator-side door is closed once it has been opened, the affirmative determination that the operator-side door has been opened is maintained, if the electronic key 52 is located outside the vehicle.

In SA2 corresponding to the power-source-position switching control means 126, a determination is made as to whether the Off state is presently established as the power source position $P_{ES}$, that is, whether the vehicle control device 82 is in the power off state. If an affirmative determination is obtained in SA2, that is, if the Off state is presently established as the power source position $P_{ES}$, the present control cycle is terminated. If a negative determination in SA2 is obtained, that is, if the Acc, On or Ready-on state is presently selected as the power source position $P_{ES}$, on the other hand, the control flow goes to SA3.

In SA3 corresponding to the shift-position determining means 130, a determination is made as to whether the shift position of the vehicle 6 (power transmitting system 10) is one of the N, D, B and R positions. If an affirmative determination is obtained in SA3, that is, if the shift position of the vehicle 6 (power transmitting system 10) is one of the N, D, B and R positions, the control flow goes to SA4. If a negative determination is obtained in SA3, that is, if the P position is selected as the shift position, on the other hand, the control flow goes to step SA8.

In SA4 corresponding to the shift-position determining means 130, a determination is made as to whether any shift position other than the R position is selected. If an affirmative determination is obtained in SA4, that is, if the N, D or B position other than the R position is selected as the shift position, the control flow goes to SA5. If a negative determination is obtained in SA4, that is, if the R position is selected as the shift position, on the other hand, the present control cycle is terminated.

In SA5 corresponding to the alarming sound generating means 136, the internal alarming device 58 is activated to generate continuously a predetermined internal alarming sound. This continuous alarming sound is stopped when the shift position has been switched to the P position. SA5 is followed by SA6.

In SA6 corresponding to the electronic-key-position determining means 124, a determination is made as to whether the electronic key 52 is located outside the vehicle. If an affirmative determination is obtained in SA6, that is, if the electronic key 52 is located outside the vehicle, the control flow goes to SA7. The determination that the electronic key 52 is located outside the vehicle means that the electronic key 52 is not present within the vehicle.

In SA7 corresponding to the alarming sound generating means 136, the external alarming device 60 is activated to generate continuously a predetermined external alarming sound, in addition to the above-indicated continuous internal alarming sound in SA5. Like the above-indicated continuous internal alarming sound, the continuously external alarming sound is stopped when the shift position has been switched to the P position, for example. SA7 is followed by SA3.

In SA8 corresponding to the power-source-position switching control means 126, a determination is made as to whether the Acc state is presently selected as the power source position $P_{ES}$. If an affirmative determination is obtained in SA8, that is, if the Acc state is presently selected as the power source position $P_{ES}$, the control flow goes to SA9. If a negative determination is obtained in SA8, that is, if the On state or Ready-on state is presently selected as the power source position $P_{ES}$, on the other hand, the control flow goes to SA10.

In SA9 corresponding to the alarming sound generating means 136, the internal alarming device 58 is activated to generate intermittently a predetermined internal alarming sound. This intermittent internal alarming sound is stopped when the operator-side door has been closed or when any power source position $P_{ES}$ other than the Acc state has been selected.

In SA10 corresponding to the electronic-key-position determining means 124, a determination as to whether the electronic key 52 is located outside the vehicle in a similar way to SA6. If an affirmative determination is obtained in SA10, that is, if the electronic key 52 is located outside the vehicle, the control flow goes to SA11.

In SA11 corresponding to the alarming sound generating means 136, the internal alarming device 58 is activated to generate a predetermined internal alarming sound once, while at the same time the external alarming device 60 is activated to generate a predetermined external alarming sound three times. SA11 is followed by SA12.

In SA12 corresponding to the stored-electric-energy-amount determining means 132, a determination is made as to whether the electric energy amount SOC stored in the electric-energy storage device 56 (battery) has been reduced to or below the above-described lower limit value $A2_{SOC}$. If an affirmative determination is obtained in SA12, that is, if the electric energy amount SOC has been reduced to or below the above-described lower limit value $A2_{SOC}$, the control flow goes to SA13.

In SA13 corresponding to the power-source-position switching means 126, a determination as to whether the Ready-on state is presently selected as the power source position $P_{ES}$. If an affirmative determination is obtained in SA13, that is, if the Ready-on state is presently selected as the power source position $P_{ES}$, the control flow goes to SA14. If a negative determination is obtained in SA13, that is, if the On state is presently selected as the power source position $P_{ES}$, the control flow goes to SA16.

In SA14 corresponding to the stored-electric-energy-amount determining means 132, a determination is made as to whether the above-described electric energy amount SOC stored in the electric-energy storage device 56 has been reduced to or blow the above-described charging start threshold value $A1_{SOC}$. If an affirmative determination is obtained in SA14, that is, if the above-described electric energy amount SOC stored in the electric-energy storage device 56 has been reduced to or blow the above-described charging start threshold value $A1_{SOC}$, the control flow goes to SA15. If the above-indicated electric energy amount SOC has been reduced to or below the charging start threshold value $A1_{SOC}$, an engine start flag used for determining whether the engine 8 should be re-started is set in an ON state in the electric power source control device 80 or in the hybrid control device 88, for example. In SA14, the affirmative determination that the electric energy amount SOC of the electric-energy storage device 56 has been reduced to or blow the above-described charging start threshold value $A1_{SOC}$ is obtained when the engine start flag is set in the ON state.

In SA15 corresponding to the passenger presence determining means 134, a determination is made as to whether any passenger is present within the vehicle. If any one of the seating sensors provided in the respective seats is in an ON state, for instance, an affirmative determination that any passenger is present within the vehicle. The determination may be made on the basis of an output signal of the above-described infrared radiation passenger sensor. If the affirmative determination is obtained in SA15, that is, if any passenger is present within the vehicle, the control flow goes to SA17. If a negative determination is obtained in SA15, that is, if any passenger is not present within the vehicle, on the other hand, the control flow goes to SA16.

In SA16 corresponding to the power-source-position switching control means 126 and the engine start permitting/inhibiting means 138, the power source position $P_{ES}$ is automatically switched to the Off state, that is, the vehicle control device 82 is turned off. Since the power source position $P_{ES}$ is automatically switched to the Off state in SA16, the engine 8 cannot be re-started even while the engine start flag is set in the ON state, and the implementation of the above-described automatic engine starting control is consequently inhibited.

In SA17 corresponding to the engine starting permitting/inhibiting means 138, the implementation of the above-described automatic engine starting control is permitted. When the implementation of this automatic engine starting control is permitted, the hybrid control device 88 implements the automatic engine starting control to start the engine 8.

The present embodiment has the following advantages (A1) through (A8). (A1) In the illustrated embodiment, the engine start permitting/inhibiting means 138 permits the implementation of the above-described automatic engine starting control while the engine 8 is held at rest, if the Ready-on state is selected as the power source position $P_{ES}$ by the power-source-position switching control means 126, if the stored-electric-energy-amount determining means 132 determines that the electric energy amount SOC stored in the electric-energy storage device 56 has been reduced to or below the above-described charging start threshold value $A1_{SOC}$, and if the passenger presence determining means 134 determines that any passenger is present within the vehicle. Thus, the electric-energy storage device 56 is charged by implementing the above-described automatic engine starting control as needed, making it possible to eliminate a need of restricting an electric power supply from the electric-energy storage device 56 to the electronic devices such as vehicle control device 82, etc., maintain a suitable electric energy amount SOC in the electric-energy storage device 56 and improve the convenience on the side of the passengers of the vehicle. Further, the present embodiment is configured to implement the above-described automatic engine starting control only when any passenger is present within the vehicle, so that a continued operation of the engine 8 contrary to an intention of the vehicle passenger after the implementation of the automatic engine starting control can be avoided. If the vehicle operator wants to go out of the vehicle while any other passenger stays within the vehicle with an air conditioner being intentionally kept on, for instance, the air conditioner can be kept on, making it possible to keep the temperature within the vehicle at an adequate level, preventing deterioration of comfort to the passenger.

(A2) The illustrated embodiment is further configured such that the engine start permitting/inhibiting means 138 inhibits the hybrid control means 120 from implementing the above-described automatic engine starting control, even in the Ready-on state selected as the power source position $P_{ES}$, irrespective of the electric energy amount SOC stored in the electric-energy storage device 56, if the shift position determining means 130 determines that the P position (parking position) is selected as the shift position, if the electronic-key-position determining means 124 determines that the electronic key 52 is located outside the vehicle, and if the passenger presence determining means 134 determines that the passenger is not present within the vehicle. Accordingly, it is possible to prevent re-starting of the engine 8 contrary to an intention of the passenger. In this respect, the intention of the passenger is accurately reflected by the selection of the P position as the shift position, which is a requirement for the engine start permitting/inhibiting means 138 to inhibit the implementation of the above-described automatic engine starting control.

(A3) The illustrated embodiment is further configured such that the power-source-position switching control means 126 automatically switches the power source position $P_{ES}$ from the Acc or On state to the Off state, that is, such that the vehicle control device 82 is halted, if the Acc or On state is selected as the power source position $P_{ES}$, if the shift position determining means 130 determines that the P position is selected as the shift position, if the electronic-key-position determining means 124 determines that the electronic key 52 is located outside the vehicle, if the stored-electric-energy-amount determining means 132 determines that the electric energy amount SOC stored in the electric-energy storage device 56 has been reduced to the above-described lower limit value $A2_{SOC}$. Accordingly, the vehicle control device 82 can be turned off, without contradiction to the intention of the vehicle passenger, while the vehicle is not placed in the above-described vehicle drivable state (Ready-on state), so that an amount of electric power consumption by the vehicle 6 can be reduced while the vehicle control device 82 is placed in the off state.

(A4) The illustrated embodiment is further configured such that the power-source-position switching control means 126 automatically switches the power source position $P_{ES}$ from the Ready-on state to the Off state, that is, such that the vehicle drivable state is canceled, and the vehicle control device is halted, if the Ready-on state is selected as the power source position $P_{ES}$, if the shift position determining means 130 determines that the P position is selected as the shift position, if the electronic-key-position determining means 124 determines that the electronic key 52 is located outside the vehicle, if the stored-electric-energy-amount determining means 132 determines that the electric energy amount SOC stored in the electric-energy storage device 56 has been reduced to the above-described charging start threshold value $A1_{SOC}$, and if the passenger presence determining means 134 determines that no passenger is present within the vehicle. Accordingly, the vehicle control device 82 can be turned off, without contradiction to the intention of the vehicle passenger, while the vehicle is placed in the above-described vehicle drivable state, so that an amount of electric power consumption by the vehicle 6 can be reduced while the vehicle control device 82 is placed in the off state. If the vehicle operator goes out of the vehicle, erroneously recognizing a change of the power source position $P_{ES}$ to the Off state while the power source position $P_{ES}$ in fact remains in the Ready-on state, for example, the power source position $P_{ES}$ is switched to the Off state according to the intention of the vehicle operator.

(A5) The vehicle 6 according to the illustrated embodiment is a hybrid vehicle provided with the engine 8 and the vehicle driving second electric motor M2 operatively connected to the drive wheels 38. In this hybrid vehicle, the electric energy amount SOC stored in the electric-energy storage device 56 can be held at an adequate value, and the convenience on the side of the vehicle passengers can be improved.

(A6) The illustrated embodiment is further configured such that the electronic key 52 is detectable within the predetermined detectable area which may consists of, for example, an entire area of the vehicle compartment, and selected areas outside the vehicle, which are near the doors and a rear luggage compartment. The electric power source control device 80 is configured to effect radio communication with the electronic key 52 located within the above-described predetermined detectable area, while implementing ID verification, to determine the location of the electronic key 52 within the detectable area, for instance, to determine whether the electronic key 52 is located within the vehicle compartment or bought out of the vehicle.

(A7) The vehicle 6 according to the illustrated embodiment is provided with the operator-side door sensor capable of detecting open and closed states of the operator-side door, for effecting the detection of the open and closed states of the operator-side door, together with the detection of the location of the electronic key 52, so that the determination as to whether the electronic key 52 exists within the vehicle or brought out of the vehicle can be easily made with a higher degree of accuracy.

(A8) The flow chart (shown in FIG. 6) according to the illustrated embodiment is formulated to automatically switch the power source position $P_{ES}$ to the Off state in SA16 only after implementation of SA11 to generate the predetermined internal alarming sound once and the predetermined external alarming sound three times. That is, the automatic processing operation in SA16 is performed if the vehicle passengers have not recognized the internal and external alarming sounds generated in the above-indicated step SA11. Thus, the alarming sounds are generated sufficiently to draw the attention of the vehicle passengers. In other words, the automatic processing operation in SA16 is effective particularly where the vehicle passengers have not recognized the internal and external alarming sounds generated in the above-indicated step S11.

While the preferred embodiment of this invention has been described in detail by reference to the accompanying drawings, for illustrative purpose only, it is to be understood that the present invention may be embodied with various changes and modifications which may occur to those skilled in the art.

While the power transmitting system 10 is not provided with a step-variable transmission in the illustrated embodiment, the step-variable transmission may be provided as a portion of the power transmitting path 10.

While the power transmitting system 10 is provided with the power distributing mechanism 16 and the first electric motor M1 in the illustrated embodiment, the present invention is applicable to a so-called "parallel hybrid" vehicle which is not provided with the first electric motor M1 and the power distributing mechanism 16, for example, and in which the engine 8, a clutch, the second electric motor M2 and the drive wheels 38 are connected in series to each other. In this respect, the above-indicated clutch is disposed, as needed, between the engine 8 and the second electric motor M2, but may be eliminated from the parallel hybrid vehicle.

In the illustrated embodiment, the vehicle 6 has a power transmission path through which the vehicle drive force is mechanically transmitted from the engine 8 to the drive wheels 38. However, the present invention is applicable to a so-called "series hybrid" vehicle in which the vehicle drive force is not mechanically transmitted from the engine 8 to the drive wheels 38, but the engine 8 is used to operate an electric generator to generate an electric energy with which an electric motor connected to the drive wheels 38 is operated to drive the vehicle. That is, the present invention is applicable to a vehicle of any drive type as long as the vehicle is arranged to stop the engine 8 as needed, even in the vehicle drivable state.

Although the vehicle 6 according to the illustrated embodiment is of an FF (front-engine front-drive) type, the present invention is applicable to a vehicle of a rear-drive type or four-wheel-drive type.

Although the lower limit value $A2_{SOC}$ is larger than the charging start threshold value $A1_{SOC}$, in the illustrated embodiment, the lower limit value $A2_{SOC}$ may be equal to the charging start threshold value $A1_{SOC}$. That is, the lower limit value $A2_{SOC}$ may be equal to or larger than the charging start threshold value $A1_{SOC}$.

In the illustrated embodiment, the internal alarming sound is intermittently generated if the operator-side door of the vehicle 6 is open, and the shifting state is the parking state while the power source position $P_{ES}$ is the Acc state. However, the internal alarming sound may be intermittently generated irrespective of the shifting state.

NOMENCLATURE OF REFERENCE SIGNS

6: Vehicle
8: Engine
52: Electronic key
56: Electric-energy storage device
80: Electric power source control device
82: Vehicle control device
84: Accessory devices

The invention claimed is:

1. A vehicular electric power source control device provided on a vehicle provided with an engine that may be stopped even in a vehicle drivable state which is established when a predetermined condition is satisfied and in which a vehicle drive force can be generated, and an electric-energy storage device which is charged by an operation of said engine, the vehicular electric power source control device permitting implementation of an automatic engine starting control to start said engine when an amount of an electric energy stored in said electric-energy storage device has been reduced to or below a predetermined charging start threshold value while the engine is held at rest in said vehicle drivable state, the vehicle electric power source control device comprising:
   an engine start permitting portion configured to permit the implementation of said automatic engine starting control under a condition that any passenger is present within the vehicle.

2. The vehicular electric power source control device according to claim 1, further comprising an engine start inhibiting portion configured to inhibit the implementation of said automatic engine starting control, irrespective of the amount of the electric energy stored in said electric-energy storage device, if an electronic key for radio communication with the vehicle to place said vehicle in said vehicle drivable state is not located within the vehicle and if said passenger is not present within the vehicle.

3. The vehicular electric power source control device according to claim 2, wherein said engine start inhibiting portion inhibits the implementation of said automatic engine starting control, irrespective of the amount of the electric energy stored in said electric-energy storage device, if a parking position for parking of said vehicle is selected, if said electronic key is not located within the vehicle, and if said passenger is not present within the vehicle.

4. The vehicular electric power source control device according to claim 2, wherein said vehicle is provided with a vehicle control device for controlling accessory devices and a vehicle drive system, the vehicular electric power source control device further comprising a power-source-position switching control, portion configured to turn off said vehicle control device if a parking position for parking of said vehicle is selected, if said electronic key is not located within the vehicle, if at least a portion of said vehicle control device is placed in an operated state, but not in said vehicle drivable state, and if the amount of the electric energy stored in said electric-energy storage device has been reduced to or below a lower limit value larger than said charging start threshold value.

5. The vehicular electric power source control device according to claim 4, wherein said power-source-position switching control portion turns off said vehicle control device if said parking position is selected, if said electronic key is not located within the vehicle, if the vehicle is placed in said vehicle drivable state, if the amount of the electric energy stored in said electric-energy storage device has been reduced to or below said charging start threshold value, and if said passenger is not present within the vehicle.

* * * * *